United States Patent [19]

Martin et al.

[11] Patent Number: 5,347,854
[45] Date of Patent: Sep. 20, 1994

[54] TWO DIMENSIONAL PROFILING WITH A CONTACT FORCE ATOMIC FORCE MICROSCOPE

[75] Inventors: Yves Martin, Ossining; Hemantha K. Wickramasinghe, Chappaqua, both of N.Y.

[73] Assignee: International Business Machines Corporation, Armonk, N.Y.

[21] Appl. No.: 948,503

[22] Filed: Sep. 22, 1992

[51] Int. Cl.[5] .................................................. G01B 5/28
[52] U.S. Cl. .................................................. 73/105
[58] Field of Search ................ 73/105; 250/306, 307; 33/558–561

[56] References Cited

U.S. PATENT DOCUMENTS

| | | | |
|---|---|---|---|
| 2,620,655 | 12/1952 | Priest | 73/105 |
| 2,943,719 | 7/1990 | Akamine et al. | 73/105 |
| 3,888,012 | 6/1975 | Droz | 33/559 |
| 4,724,318 | 2/1988 | Binnig | 250/306 |
| 4,780,961 | 11/1988 | Shelton et al. | 33/559 |
| 4,888,550 | 12/1989 | Reid | 324/158 |
| 4,935,634 | 6/1990 | Hansma et al. | 250/560 |
| 5,003,815 | 4/1991 | Martin et al. | 73/105 |
| 5,017,010 | 5/1991 | Mamin et al. | 336/345 |
| 5,025,658 | 6/1991 | Elings et al. | 73/105 |
| 5,060,216 | 10/1991 | Suzuki et al. | 369/44.41 |
| 5,166,516 | 11/1992 | Kajimura | 250/307 |
| 5,198,715 | 3/1993 | Elings et al. | 250/306 |

OTHER PUBLICATIONS

"Surface Profilometer With Ultra–High Resolution", IBM Technical Disclosure Bulletin, V. 34, No. 4A, Sep. 1991, pp. 1–2.

L. C. Kong et al, "A Micromachined Silicon Scan Tip For An Atomic Force Microscope", IEEE, 1990, pp. 28–31.

G. Meyer et al, "Simultaneous measurement of lateral and normal forces with an optical–beam–deflection atomic force microscope", Appl. Phys. Lett., vol. 57, No. 20, 1990, pp. 2089–2091.

M. Rodgers, et al, "Using the Atomic Force Microscope to measure submicron dimensions of integrated circuit devices and processes", SPIE vol. 1464, 1991, pp. 358–366.

*Primary Examiner*—Robert Raevis
*Attorney, Agent, or Firm*—Philip J. Feig; Stephen C. Kaufman

[57] ABSTRACT

Two dimensional profiling of samples, such as integrated circuits containing trenches or lines, is accomplished using contact force atomic force microscopy by controlling the tip position responsive to the real-time measured local slope of the surface in contact with the tip.

5 Claims, 4 Drawing Sheets

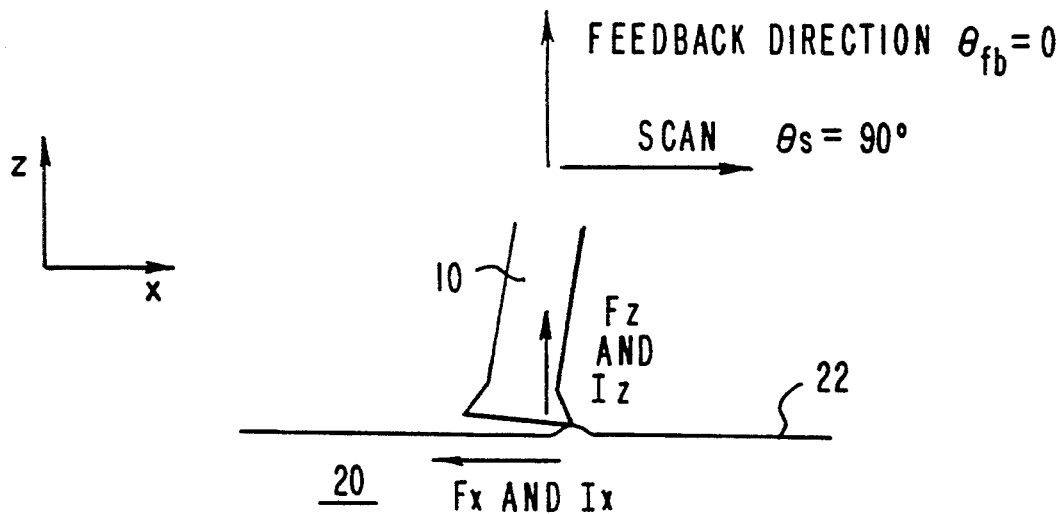
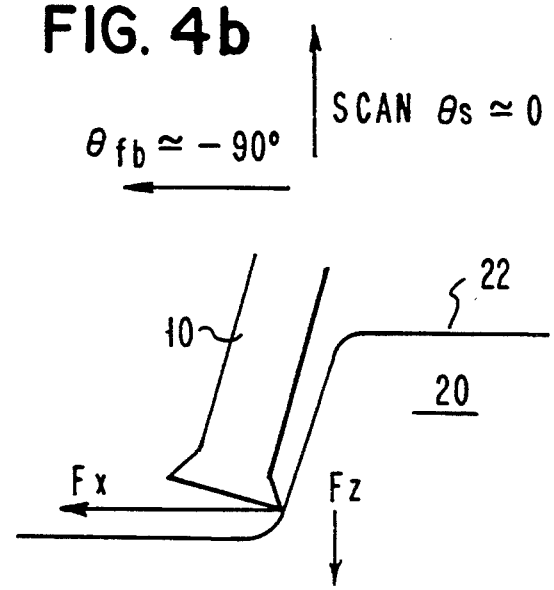

TWO DIMENSIONAL PROFILING WITH A CONTACT FORCE ATOMIC FORCE MICROSCOPE

BACKGROUND OF THE INVENTION

The present invention relates to two dimensional profiling using a contact force atomic force microscope (AFM) and specifically relates to profiling sidewalls of lines and trenches in integrated circuits.

There are commercially available atomic force microscopes (AFM) which operate in a contact mode, that is, the tip and the sample are in contact while the tip scans the surface of the sample. One such apparatus is described in the article entitled "Using the Atomic Force Microscope to Measure Submicron Dimensions of Integrated Circuit Devices and Processes" by M. P. Rodgers and K. M. Monahan, SPIE, Vol. 1464 Integrated Circuit Metrology, Inspection and Process Control V, 1991, pages 358-366.

A major advantage of contact mode atomic force microscopes is the simplicity of construction. A major disadvantage of these atomic force microscopes is the inability of the AFM to profile high aspect ratio structures having steep sidewalls. Contact mode AFMs are unable to readily accommodate long and narrow-angle tips or "boot-shaped" tips because of the simple detection system used to measure the tip motion.

The present invention overcomes these disadvantages of two-dimensional profiling of a surface using a contact mode AFM, particularly for profiling sidewalls of steep lines and trenches of integrated circuits. The present invention relies upon the two-dimensional detection of the tip motion for controlling the scanning of the tip over the sample surface. The invention also concerns the optimization of the cantilever and tip dimensions of an atomic force microscope.

Detection of tip motion in one dimension involves the use of tunneling, capacitive, inductive or optical methods. These methods can be modified to permit the measurement of the tip motion in two dimensions.

Two dimensional detection of the tip motion is described in the article entitled "Simultaneous Measurement of Lateral and Normal Forces with an Optical-Beam-Deflection Atomic Force Microscope" by G. Meyer and N. M. Amer, Appl. Phys. Lett. 57 (20), Nov. 12, 1990, pages 2089 to 2091 which is incorporated herein by reference. In the described apparatus, the tip is attached to a spring-like cantilever. Vertical tip motion causes the cantilever to bend in a conventional up/down manner. Lateral tip motion causes the cantilever to twist along its longitudinal axis. A laser beam deflected from the cantilever is detected by a 4-quadrant detector. The vertical tip motion and lateral tip motion is measured from the four detected signals.

Another two dimensional detection arrangement involves the use of piezo-resistive measurement of the cantilever bend. In this arrangement, the cantilever is made of partly doped semiconductor material, such as silicon. The strain induced in the cantilever when the cantilever is bent causes a resultant change in the resistance of the semiconductor material which is then measured. The cantilever is bifurcated in order to provide two independent resistance signals for measuring two dimensional motion of the cantilever. Both bifurcated regions comprise doped semiconductor material regions. Electrical contacts are provided at the respective distal ends of each region and at the center of the cantilever where the regions are joined. These three contacts form two resistor circuits, i.e. each respective region with the center, which are inserted into a bridge circuit. The difference between the two resistances is measured by the bridge. Additionally, the combined series resistance of the two regions is a measure of the overall bending of the cantilever in the vertical direction.

The profiling of vertical surfaces in a substrate using non-contact scanning force microscopy is described in co-pending patent application Ser. No. 07/830,804 assigned to the same assignee as the present invention, which is incorporated herein by reference.

SUMMARY OF THE INVENTION

The present invention provides for two dimensional tip motion detection and control in a contact force atomic force microscope by optimization of the dimensions of the tip and cantilever used in the atomic force microscope and by the use of feedback control of the tip motion.

In a first embodiment, so-called "d.c." mode, the tip is scanned in steps along the surface of a sample in a direction parallel to the plane of the surface. A two axis feedback control is used to maintain an approximately constant net force of the tip on the surface. Sensors are used to measure the Z-axis or vertical force of the tip on the surface and the X-axis or scan direction frictional force generated while the tip "drags" along the surface. Responsive to the X-axis and Z-axis measured signals, both the direction of the next scan step as well as the direction of the feedback adjustment are determined. In this manner, the tip follows the surface contour.

In an alternative embodiment, so-called "a.c." mode, the tip is made to undergo small amplitude vibratory motion along both an axis parallel to the longitudinal axis of the tip in a vertical direction and along a horizontal axis normal to the longitudinal axis of the tip and generally parallel to the plane of the sample surface, at a frequency above approximately 1 khz. Signals in both the vertical and horizontal directions are detected in order to determine the local slope of the surface in the vicinity of the tip. The tip position is moved responsive to the local sample slope.

Additionally, in accordance with the teachings of the present invention, optimal cantilever and tip dimensions are calculated for permitting two-dimensional contact force atomic force microscopy of sidewalls in integrated circuits.

A principal object of the present invention is therefore, the provision of two-dimensional contact force atomic force microscopy of steep contours in a sample.

Another object of the invention is the provision of two-dimensional contact force atomic force microscopy of sidewalls of structures, such as lines and trenches, in an integrated circuit.

A further object of the invention is the provision of optimal tip and cantilever dimensions for use in contact mode atomic force microscopes for use in two dimensional profiling of a sample surface.

Further and still other objects of the present invention will become more clearly apparent when the following description is read in conjunction with the accompanying drawing.

BRIEF DESCRIPTION OF THE DRAWING

FIGS. 4a–4d illustrate scanning of different surfaces.

DETAILED DESCRIPTION

Figure 1A:
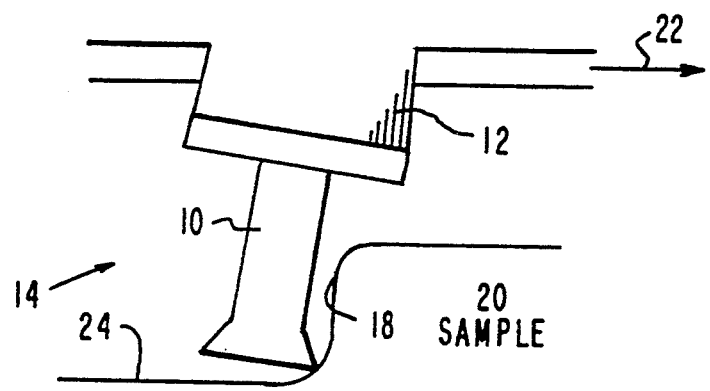
FIGS. 1a-1d are schematic representations of a tip scanning a sample having a trench.

Atomic force microscopes are described in U.S. Pat. No. 4,724,318 issued to G. Binnig and assigned to the same assignee at the present application, which patent is incorporated herein by reference.

According to the teachings of the Binnig patent, a tip connected at an end region of a cantilever is brought so close to the surface of a sample to be investigated that the forces occurring between the atoms at the apex of the tip and those at the surface cause a spring-like cantilever to deflect. The deflection of the cantilever provides a variation of a tunnel current, and that variation is used to generate a correction signal which can be employed to control the distance between the tip and the surface of the sample, in order, for example, to maintain the force between the tip and sample constant as the tip is scanned across the surface of the sample by means of an xyz-drive.

Referring now to the figures and to FIGS. 1a to 1d in particular, there is shown a representation (not drawn to scale), of a tip 10 coupled to a cantilever 12 of an atomic force microscope which tip is disposed within a trench 14 located in substrate 20, the sidewalls 16 and 18 of which are to be profiled. Preferably the tip 10 has a "boot" shaped cross-section in order to enable sensing of a bottom corner of a trench or line.

In the so-called "d.c. mode", the tip 10 remains in contact with the sample surface. For most materials, the tip is attracted to the surface by van der Walls, capillary and electric forces that are in the order of $10^{-7}$ Newton.

When the tip scans the sample in the direction of arrow 22 shown in FIG. 1a, the tip drags along the surface of the sample. Conventional Z-axis or vertical feedback control, as is well known to those skilled in the art, is used in order to maintain a constant deflection signal and hence a constant Z-axis force maintaining the tip in contact with the surface.

Concurrently, the scan or x-axis direction motion of the tip is monitored, such as by using the method described in the article by Meyer et al, which is incorporated herein by reference. When the net force in the x-axis and z-axis directions exceeds a predetermined value, indicative of the tip encountering an upward slope, the tip position is moved upward, following the contour of the surface. The process is described in greater detail below in conjunction with the description of FIGS. 4a–4d.

As used herein, the term z-axis will be understood to be a direction parallel to the longitudinal axis of the tip. The term x-axis will be understood to be scan direction, substantially normal to the longitudinal axis of the tip and generally parallel to the plane of the surface of the sample.

The tip motion is controlled by the use of piezoelectric drives for x-axis, y-axis and z-axis direction movement. While the tip is moved vertically, the deflection signal in the x-axis direction is maintained within a predetermined window or range of values in order to assure that the force of the tip on the sample in the x-axis or scan direction is maintained relatively constant during the scanning operation. When the tip 10 reaches the top of the sidewall 18, the measured force or detector current decreases to a value below the window and the normal, horizontal scan motion resumes.

Figure 1B:
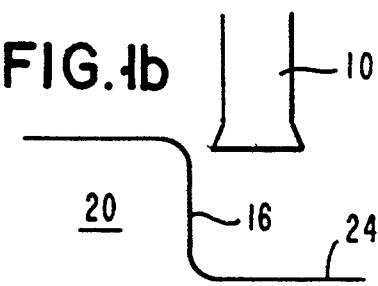

While the above arrangement performs well as described, a problem occurs when the tip encounters a downward slope (FIG. 1b). When the slope is more than approximately 45°, the tip may be unable to follow the surface contour and thereby lose contact with the sample. One solution to this problem is to modify the Z-axis feedback loop to maintain a constant $IZ + |IX|$, where IZ is the signal indicative of the force in the Z-axis direction and IX is the signal indicator of the force in the scan direction. When the tip scans from a planar area to a downward slope, IX changes from being negative (due to the frictional force of the tip being dragged along the surface) to being approximately zero when the frictional force changes direction. In order to compensate, the value IZ will be increased and tip will be moved downward and thereby maintain contact with the sample (FIG. 1c).

Figure 1C:
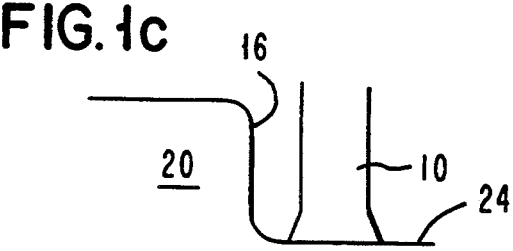
Figure 1D:
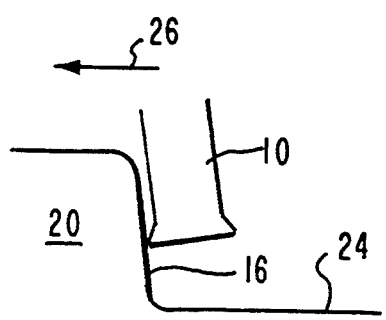

If the tip loses contact with the surface as shown in FIG. 1b, the tip is lowered until contact is reestablished at the bottom surface 24 of the trench as shown in FIG. 1c. At this time, the scanning direction is reversed to the direction of arrow 26 for a short distance in order to scan the negative slope portion of the sample as shown in FIG. 1d.

In an alternative embodiment useful for profiling downward slopes the tip 10 is made to "tap" on the sample surface at a high rate, typically at a frequency above 1 khz. This embodiment is referred to as an "a.c. mode".

Figure 2:
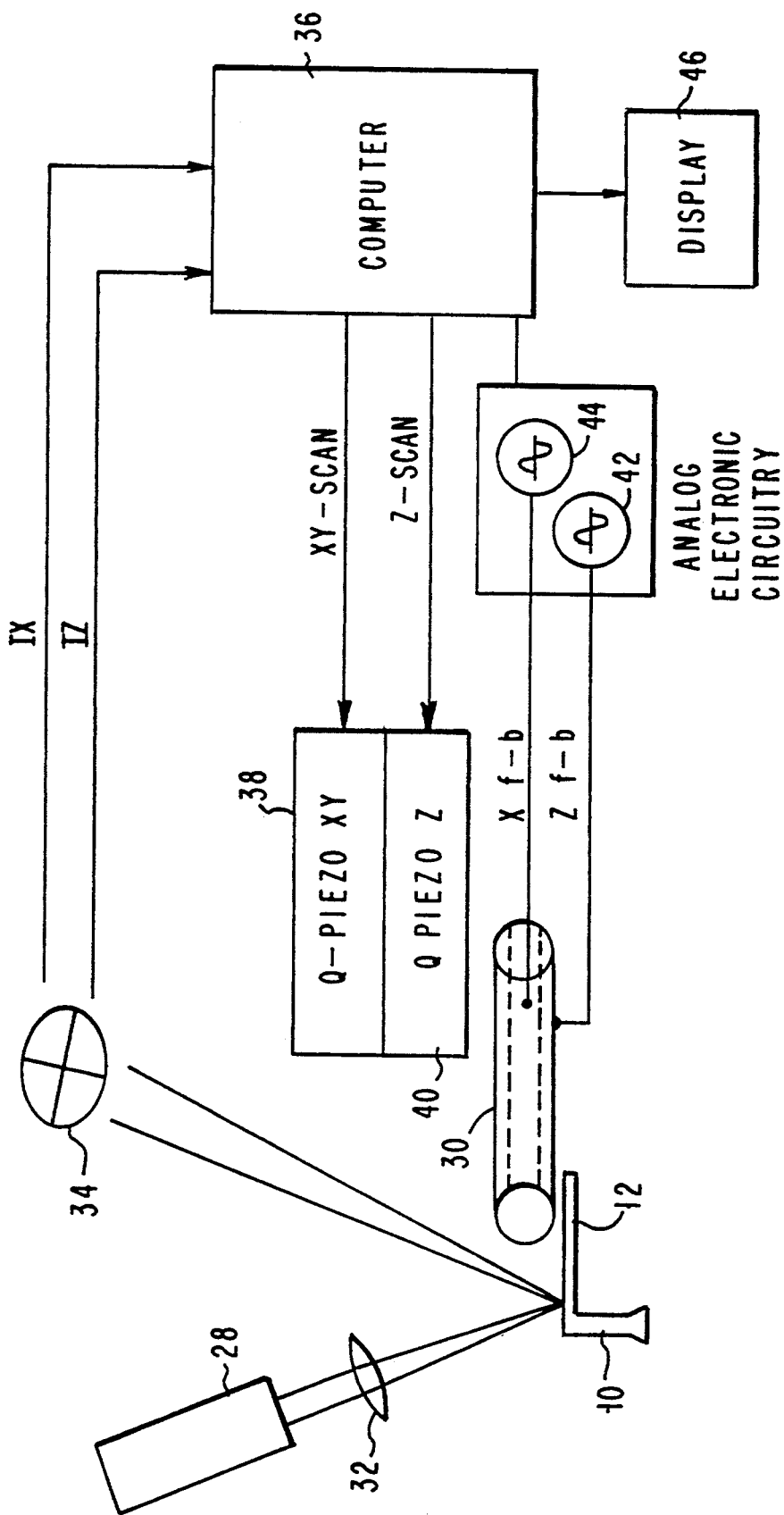
FIG. 2 is a schematic block diagram of a preferred embodiment of the invention.

FIG. 2 is a schematic representation of an arrangement for performing a.c. mode profiling of a surface.

Cantilever 12 with tip 10 is coupled to a fast x-z piezoelectric tube scanner 30 for rapidly and accurately controlling the position of tip 10 in both the x-axis and z-axis direction. A laser 28 transmits a laser beam through collimeter lens 32 onto the back of the cantilever 12 where the beam is reflected to a two dimensional displacement sensor. Preferably, the two-dimensional displacement sensor includes a quadrant photodetector as described in the article to Meyer et al supra. Alternatively two-dimensional displacement sensors may comprise piezoresistive cantilever, capacitive, inductive, tunneling, optical or interferometrical devices. The photodetector 34 accurately detects the displacement and orientation of the cantilever and hence the tip and provides signal IX and IZ indicative of the force on the tip in the scan direction and in the vertical direction respectively. The amplitude and sign of these signals are received and recorded by a computer 36.

The tip 10 position is determined responsive to scan signals from computer 36 to xy-piezoelectric 38 for scanning the tip in a plane parallel to the top surface of the sample and to Z-piezoelectric 40 for depth or vertical direction displacement.

In addition to the scan motion provided in response to the signals from computer 36, the tip is made to vibrate in Z-axis direction at a high frequency, greater than 1 khz, preferably in a range between 1 and 100 khz, at an amplitude of several angstroms, typically 10 Å at a frequency of 10 khz, by virtue of a signal from oscillator 42 to the piezoelectric tube scanner 30.

The tip 10 is also made to undergo vibratory motion about its nominal position in the x-axis direction at a high frequency, also greater than 1 khz, typically in the range between 1 and 100 khz, but at a different frequency than that in Z-axis direction. The x-axis motion is at an amplitude of several angstroms, typically 10 Å at a frequency of 15 khz. The x-axis vibratory motion is provided by virtue of a signal from oscillator 44 to the piezoelectric tube scanner 30.

Additional electronic circuitry which is a part of the photodetector circuitry (not shown) converts the photodetector currents into the proper IX and IZ signals as is known in the art. The signals IX and IZ from the photodetector are received and recorded by computer 36. The ratio of IX to IZ represents the local slope of the sample at the point in contact with the tip.

The profile of the sample is displayed on display 46 responsive to signals provided by computer 36.

On a horizontal surface the amplitude of IZ is a maximum and the amplitude of IX is substantially zero because the cantilever is not undergoing any twist or torsion motion in the x-axis or scan direction. On a vertical surface the IX signal is a maximum and the IZ signal is a minimum. Moreover, the sign of the IX signal is indicative of whether the slope of the surface is upward or downward. Also, the phase of the IX signal is in phase with the x-piezoelectric excitation signal or is 180° out of phase with the x-piezoelectric excitation signal, depending upon the slope of the surface. The average tip-to-sample spacing is obtained from the magnitude of the square of the IX signal and IZ signal amplitudes. Based upon the known average tip-to-sample spacing and the local sample slope at a given point, the computer is able to move the tip in the appropriate direction in order to follow the sample and to maintain contact with the sample, without interruption of the scan motion.

It will be apparent to those skilled in the art that the arrangement shown in FIG. 2 is readily modifiable for operation in the d.c. mode. Since the tip does not undergo any vibratory motion, the oscillators 42, 44 are eliminated. The photodetector circuitry is modified since the laser beam reflected from the cantilever does not contain a high frequency component and hence, signal processing for obtaining the signals IX and IZ is simplified.

In a modification of the above described modes of operation, the vibratory motion is applied in only one direction, preferably in the x-axis or scan direction. An advantage of this hybrid arrangement is that conventional tips can be used which have a small length and the stiffness in the x-axis direction is large and the stiffness in the z-axis direction is small.

For high accuracy measurement, the x and z piezoelectric drives must be highly linear, i.e. maximum nonlinearity is 0.3%, with minimum hysteresis. To achieve these conditions, independent x-axis and z-axis motion sensors, such as piezoresistive, capacitive, inductive or optical sensors are used.

In order to understand the computer control of the tip motion reference is made to FIG. 4a to 4d. A tip 10 scans along the surface 22 of sample 20 in the scan direction $\theta_s$ as determined by the signals IX and IZ previously measured. At each new location the signals IX and IZ are measured again. Based upon these signals, the tip is moved in the feedback direction of $\theta_{fb}$ for "correction" purposes and the sequence is repeated.

There are two directions used in the above sequence. The vertical direction is defined as zero. The scan direction is $\theta_s$ and the feedback direction for an analog servo control is $\theta_{fb}$. Therefore, the above sequence can be written as 1. move tip: step tip in direction $\theta_s$ by preset length S;
2. track surface: measure IZ and IX and move tip along $\theta_{fb}$ to optimize function of IZ and IX to be constant, preferably $IZ + |IX|$;
3. change direction: $\theta_s$ is defined using the new values of IX and IZ. It may also be a function of the local slope defined between the new point and previously recorded points, using an averaging method. The value $\theta_{fb}$ is a function of $\theta_s$. Preferably, $\theta_{fb} = \frac{1}{2}(\theta_s - 90°)$ or $\theta_{fb} = (\theta - 90°)$ or a value between these two values. The three cases described below assign values to $\theta_s$ and $\theta_{fb}$ as a function of IX and IZ.
4. Adjust $\theta_{fb}$ according to the results of step 3.

FIG. 4a illustrates a flat surface being profiled. The cantilever urges the tip on the surface and the tip drags as it travels along the surface. With the axes as shown, IZ is positive and IX is negative. The values $IZ_o$ and $IX_o$ are the initial values for IZ and IX on a flat surface. These initial values can be considered offsets and the hardware and/or optics can be adjusted so that $IZ_o$ and $IX_o$ are both equal to zero. For the case of a flat surface, $IZ = IZ_o$ and $IX = IX_o$ and $\theta_s = 90°$ and $\theta_{fb} = 0°$.

FIG. 4b illustrates an upward slope surface being profiled. The value IX will be more negative than $IX_o$ since the lateral force will increase. The atomic force microscope will tend to raise the tip in order to decrease IZ and maintain $IZ + |IX|$ constant. The value of $\theta_s$ will change from 90° and decrease toward 0° or beyond 0° as $IX - IX_o$ becomes more negative and correspondingly, $\theta_{fb}$ will change from 0 degrees to a value up to $-90$ degrees as required. Therefore, the tip will scan upward and the feedback direction will tilt to the left as shown.

Figure 4C:
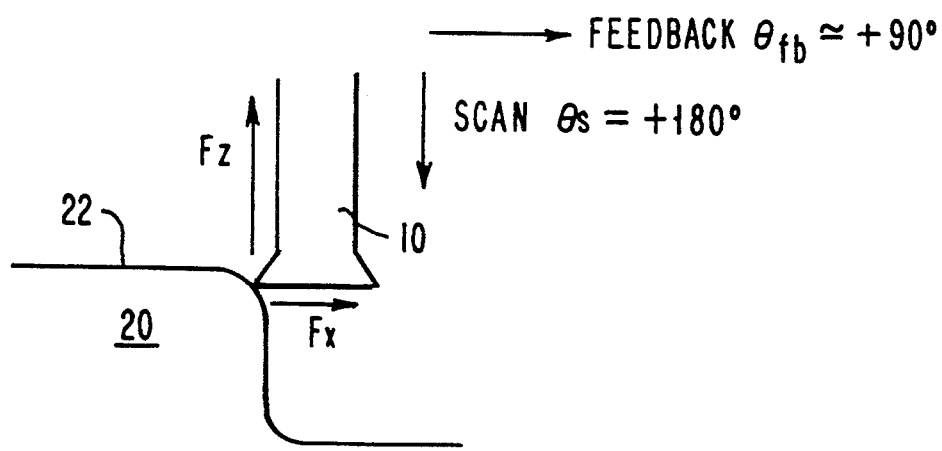

FIG. 4c illustrates a downward slope being profiled. The dragging force decreases and IX becomes smaller than $IX_o$ and IZ increase to maintain $IZ + |IX|$ constant. The tip starts to move downward and the scan direction $\theta_s$ changes from its immediately past value to $+180$ degrees or to a value in between, as a function of $IX - IX_o$. The direction $\theta_{fb}$ will change toward a positive value accordingly.

Figure 4D:
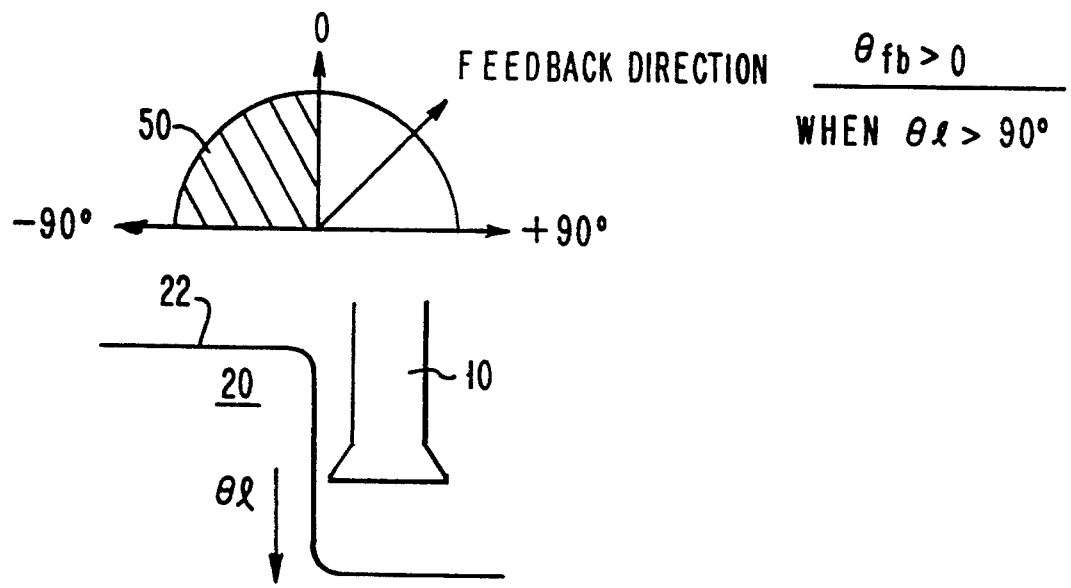

FIG. 4d illustrates a bottom corner to be profiled. When the tip is located as shown in FIG. 4d it is essential that transient values of IX do not change the feedback direction to a value that could cause tip damage (in the shaded area 50), i.e. a negative value in the embodiment per FIG. 4d. In order to avoid this problem, the local slope limits the value of $\theta_{fb}$. In the case shown in FIG. 4d, the permitted value of $\theta_{fb}$ is greater than 0 degrees when the local slope is greater than 90 degrees. Conversely, the permitted value of $\theta_{fb}$ is less than 0 degrees when the local slope is less than 90 degrees.

An important aspect of the present invention is the dimension of the tip and cantilever. Preferably, the stiffness constants in the x-axis and z-axis directions should be of the same order of magnitude. The ratio of these two stiffness constants is:

$$2L^2/3(1+\nu)h^2 = 0.6L^2/h^2$$

where $\nu$ = Poisson's ratio, L = cantilever length and h is tip height.

Therefore, the ideal relation between the tip height and the cantilever length is h = 0.6 L. For most presently available tips, however, h is in the range between 0.1 L and 0.01 L and therefore, the stiffness in the x-axis direction is much larger than the stiffness in the z-axis direction.

In order to achieve high sensitivity of the sensor described in Meyer et al, the laser beam incident on the cantilever should be loosely focussed so that the laser beam is reflected from a large area of the cantilever. Since the cantilever deflects in both the x-axis and z-axis directions, the best shape of the reflection area of the cantilever is a circle.

Figure 3:
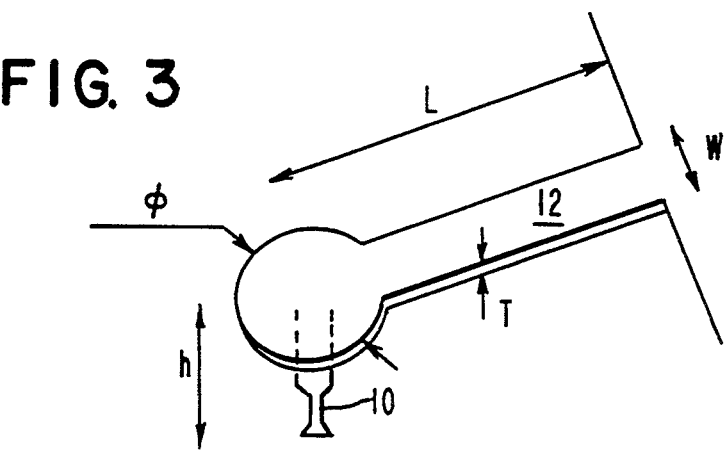
FIG. 3 is a diagram of a tip and cantilever useful for practicing the present invention.

A preferred cantilever design is shown in FIG. 3. Assuming a laser beam having 1 mw of power and a detection bandwidth of 10 khz, the minimum measurable displacement is $d_{min} = 2.4 \times 10^{-8} D$, where D is either the cantilever length or the tip height, depending upon the displacement direction. Hence, $d_{minz} = 0.012$ Å and $d_{minx} = 0.005$ Å. The two stiffness constants are optimized by adjusting the thickness T of the cantilever for each mode of operation described above.

In the case of d.c. mode operation, the stiffness is chose to be small, so that the additional force on the tip due to cantilever bending, remains small, e.g. $T = 0.5$ μm, $k_z = 0.5$ N/m and $k_x = 1.2$ N/m. In the case of a.c. mode operation, in order to overcome the relatively large attraction force between the tip and the sample at each point, the cantilever stiffness must be large, i.e. greater than 20 N/m, so that the vibratory motion of the piezoelectric and the tip can be maintained at a relatively small amplitudes, e.g. less than 100 Å $T = 1.5$ μm, $k_z = 12$ N/m and $k_x = 30$ N/m.

While there has been described and illustrated two dimensional profiling of a sample using a contact force atomic force microscope, it will be apparent to those skilled in the art that modifications and variations are possible without deviating from the broad scope of the invention which shall be limited solely by the scope of the claims appended hereto.

What is claimed is:

1. A method of two dimensional profiling of a sample surface using a tip of a contact force atomic force microscope, said tip having a longitudinal axis and said tip undergoing motion in a scan direction, comprising the steps of:

maintaining the tip in contact with the surface;

determining the local slope of the surface by sensing the force of the tip in contact with surface in a first direction substantially parallel to the longitudinal axis of the tip and in a second direction substantially normal to the longitudinal axis of the tip and in the scan direction; said sensing causing the tip to undergo vibratory motion in said second direction; and controlling the position of the tip responsive to said determining the local slope for causing the tip to follow the profile of the surface.

2. A method of two dimensional profiling of a sample surface as set forth in claim 1 wherein said sensing includes causing the tip to undergo vibratory motion in said first direction and in said second direction.

3. An apparatus for two dimensional profiling of a sample surface using a tip of a contact force atomic force microscope, said tip having a longitudinal axis and said tip undergoing motion in a scan direction, comprising:

means for maintaining said tip in contact with the surface;

means for sensing the force of the tip in contact the surface in a first direction substantially parallel to the longitudinal axis of the tip and in a second direction substantially normal to the longitudinal axis of the tip and in the scan direction;

means for controlling the position of the tip responsive to said force in the first direction and said force in the second direction; and means for causing said tip to undergo vibratory motion in the second direction.

4. An apparatus for two dimensional profiling of a sample surface as set forth in claim 3, further comprising first means for causing said tip to undergo vibratory motion in the second direction and second means for causing said tip to undergo vibratory motion in said first direction.

5. An apparatus for two dimensional profiling of a sample surface as set forth in claim 3, further comprising display means coupled to said means for sensing and said means for controlling for displaying the profile of the surface.

* * * * *